(12) United States Patent
Snell et al.

(10) Patent No.: US 12,000,629 B2
(45) Date of Patent: Jun. 4, 2024

(54) HYBRID COOLING SYSTEMS FOR HERMETIC MOTORS

(71) Applicant: Tyco Fire & Security GmbH, Schaffhausen (CH)

(72) Inventors: Paul William Snell, York, PA (US); Matthew Lee Heisey, York, PA (US); Tyler Alexander Wolgemuth, Mount Wolf, PA (US); Katelynn Louise Crissman, Harrisonburg, VA (US); Ian Michael Casper, York, PA (US); David Andrew Bradshaw, Timonium, MD (US)

(73) Assignee: Tyco Fire & Security GmbH, Schaffhausen (CH)

( * ) Notice: Subject to any disclaimer, the term of this patent is extended or adjusted under 35 U.S.C. 154(b) by 973 days.

(21) Appl. No.: 16/723,400

(22) Filed: Dec. 20, 2019

(65) Prior Publication Data

US 2021/0190395 A1 Jun. 24, 2021

(51) Int. Cl.
*F25B 31/00* (2006.01)
*H02K 5/20* (2006.01)
*H02K 9/04* (2006.01)

(52) U.S. Cl.
CPC .............. *F25B 31/006* (2013.01); *H02K 5/20* (2013.01); *H02K 9/04* (2013.01)

(58) Field of Classification Search
CPC ........ F25B 31/006; H02K 5/20; H02K 5/203; H02K 9/04
See application file for complete search history.

(56) References Cited

U.S. PATENT DOCUMENTS 3,057,172 A 10/1962 Ditzler
4,517,479 A * 5/1985 Aleem .................. H02K 9/197
310/260

(Continued)

FOREIGN PATENT DOCUMENTS

JP 2005312272 A * 11/2005
JP 2005312272 A 11/2005

(Continued)

OTHER PUBLICATIONS

Iritani (JP 2005312272 A) English Translation (Year: 2005).*

(Continued)

*Primary Examiner* — Tulsidas C Patel
*Assistant Examiner* — Robert E Mates
(74) *Attorney, Agent, or Firm* — Fletcher Yoder P.C.

(57) ABSTRACT

A hybrid cooling system for a hermetic motor includes an annular cavity in a motor housing that receives a vapor flow and an annulus in the motor housing that receives a liquid flow. The hybrid cooling system includes a sleeve disposed adjacent to the annular cavity and the annulus, where a radial opening is defined through the sleeve. The hybrid cooling system includes a stator at least partially surrounded by the sleeve, a gap defined between the stator and a rotor, and a vent slot of the stator configured to receive the vapor flow from the annular cavity through the radial opening of the sleeve and direct the vapor flow to the gap. The hybrid cooling system includes an exit path in the motor housing configured to direct an evaporated vapor flow, generated from the liquid flow contacting the stator, and the vapor flow out of the motor housing.

20 Claims, 8 Drawing Sheets

(56) References Cited

U.S. PATENT DOCUMENTS

| | | | |
|---|---|---|---|
| 9,291,167 B2 | 3/2016 | Schreiber | |
| 2005/0206248 A1* | 9/2005 | Raszkowski | F16H 57/0475 |
| | | | 310/112 |
| 2007/0212232 A1 | 9/2007 | De Larminat | |
| 2008/0024020 A1* | 1/2008 | Iund | B60L 50/61 |
| | | | 310/90 |
| 2010/0006262 A1 | 1/2010 | Welch et al. | |
| 2015/0226467 A1 | 8/2015 | Sommer et al. | |
| 2016/0138841 A1 | 5/2016 | Thornton et al. | |
| 2017/0082119 A1 | 3/2017 | Schreiber | |
| 2018/0073521 A1 | 3/2018 | Kobayashi et al. | |
| 2019/0006908 A1* | 1/2019 | Scharlach | H02K 5/203 |
| 2020/0240677 A1* | 7/2020 | Crissman | H02K 5/203 |

FOREIGN PATENT DOCUMENTS

| | | | | |
|---|---|---|---|---|
| JP | 2007244067 A | * | 9/2007 | |
| WO | 2019/075105 | | 4/2019 | |
| WO | WO-2019075105 A1 | * | 4/2019 | F25B 1/04 |

OTHER PUBLICATIONS

Aota (JP 2007244067 A) English Translation (Year: 2007).*
PCT/US2018/055271 International Search Report and Written Opinion dated Jan. 30, 2019.
PCT International Search Report and Written Opinion for PCT Application No. PCT/US2020/066060 dated Apr. 6, 2021, 34 pgs.

* cited by examiner

HYBRID COOLING SYSTEMS FOR HERMETIC MOTORS

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A compressor of a refrigeration cycle is driven by a shaft, which may be rotated by a motor. Heat (e.g., thermal energy) may be generated as electrical current passes through a stator of the motor formed by a series of windings, which drives rotation of a rotor of the motor that is coupled to the shaft. The rotor and stator are contained within a motor housing, which may experience an increase in temperature as heat is generated by operation of the motor. In some compressors, the rotor may be supported by electromagnetic bearings, which may also generate heat and further increase the temperature within the motor housing. Accordingly, cooling fluid may be provided to the motor via a cooling system to remove heat and avoid a decrease in performance or shutdown of the motor caused by overheating. Unfortunately, the cooling fluid provided by some cooling systems may generate large temperature gradients (e.g., cold spots, hot spots) within the motor. For example, the cooling fluid may be a chilled liquid, which may occasionally overcool a housing of the motor and cause condensation to form on an exterior of the housing. In addition to cosmetic issues, water condensation may pose reliability issues to electronic components located on the exterior of the housing.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a hybrid cooling system for a hermetic motor includes an annular cavity in a motor housing. The annular cavity is configured to receive a vapor flow from a main refrigerant circuit. The hybrid cooling system includes at least one annulus in the motor housing. The at least one annulus is configured to receive a liquid flow from the main refrigerant circuit. The hybrid cooling system also includes a sleeve disposed within the motor housing adjacent to the annular cavity and the at least one annulus. At least one radial opening is defined through the sleeve and in fluid communication with the annular cavity. The hybrid cooling system also includes a stator at least partially surrounded by the sleeve, as well as a gap defined between the stator and a rotor of the hermetic motor. Additionally, the hybrid cooling system includes a vent slot of the stator configured to receive the vapor flow from the annular cavity through the at least one radial opening of the sleeve and direct the vapor flow to the gap. The hybrid cooling system also includes an exit path in the motor housing configured to direct an evaporated vapor flow, generated from the liquid flow contacting the stator, and the vapor flow out of the motor housing In another embodiment, a hermetic motor for a compressor of a heating, ventilating, air conditioning, and refrigeration (HVAC&R) system includes a stator configured to cause rotation of a rotor that drives the compressor. A vent slot is defined through a central portion of the stator to fluidly couple a radially outward surface of the stator to an annular gap defined between the stator and the rotor. The hermetic motor includes a sleeve circumferentially surrounding a portion of the radially outward surface of the stator and a motor housing disposed around the stator and the sleeve. The motor housing defines a first annulus and a second annulus each adjacent to the sleeve. The first annulus and the second annulus are each configured to direct a respective liquid flow through the sleeve to the stator. The motor housing also defines an annular chamber adjacent to the sleeve. The annular chamber is axially positioned between the first annulus and the second annulus. The annular chamber is configured to direct a vapor flow from the annular chamber, through the sleeve and the vent slot, and into the annular gap.

In another embodiment, a heating, ventilating, air conditioning, and refrigeration (HVAC&R) system includes a main refrigerant circuit including a compressor, a condenser, an expansion device, and an evaporator coupled in series. A high pressure side of the main refrigerant circuit is defined between an outlet of the compressor and an inlet of the expansion device. The HVAC&R system includes a motor configured to drive the compressor and a hybrid cooling system. The hybrid cooling system includes a cooling refrigerant circuit configured to direct a vapor flow from the high pressure side of the main refrigerant circuit to the hermetic motor, direct a liquid flow from the condenser to the hermetic motor, and direct warmed refrigerant from the motor to the evaporator. The hybrid cooling system also includes a housing of the motor defining a first annulus, a second annulus, and an annular chamber axially positioned between the first annulus and the second annulus. The first annulus and the second annulus are each configured to receive the liquid flow from the cooling refrigerant circuit and direct the liquid flow to a stator of the hermetic motor. The annular chamber is configured to receive the vapor flow from the cooling refrigerant circuit and direct the vapor flow to a gap between the stator and a rotor of the hermetic motor.

Other features and advantages of the present application will be apparent from the following, more detailed description of the embodiments, taken in conjunction with the accompanying drawings which illustrate, by way of example, the principles of the application.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are directed toward a heating, ventilation, air conditioning, and refrigeration (HVAC&R) system having a hybrid cooling system that controls a temperature of a motor (e.g., hermetic motor, electric motor), which is utilized to drive a compressor of the HVAC&R system. To drive the compressor, electrical current is directed through a stator of the motor, which causes a rotor of the motor to rotate, generating rotation of components of the compressor via a shaft coupled between the rotor and the compressor. Motors generate heat during their operation, for example, as results of winding resistance and eddy current losses from the electrical current that is supplied to the motor. The heat produced by the motor may be transferred to a motor housing as thermal energy, thereby increasing a temperature of the motor. Accordingly, a cooling system may be coupled to the motor housing to absorb the thermal energy and reduce the temperature of, or cool, the motor. In some embodiments, the cooling system circulates refrigerant from a main refrigerant circuit of the HVAC&R system into the motor housing to absorb the thermal energy in the motor housing. For example, refrigerant (e.g., the cooling fluid of the cooling system) may be directed from a condenser of the HVAC&R system and into the motor housing to absorb thermal energy generated during operation of the motor. The refrigerant may then be directed back to the main refrigerant circuit of the HVAC&R system from the motor housing.

It is now recognized that only providing the refrigerant to the motor housing as a liquid may limit a range of operation of the HVAC&R system to operating modes that enable the motor to be suitably cooled by the refrigerant liquid. Additionally, it is now recognized that the refrigerant liquid may overcool the motor housing (e.g., below a dew point) in certain situations, enabling condensation to accumulate on an exterior surface of the motor housing. As such, the present disclosure introduces a hybrid cooling system that delivers both refrigerant vapor (e.g., cooling vapor) and refrigerant liquid (e.g., cooling liquid), via respective inlet ports, to the motor to efficiently control a temperature of the motor and the motor housing thereof. For example, the hybrid cooling system includes a first inlet port at a first end of the stator of the motor, a second inlet port at a second end of the stator, and a third inlet port positioned between the first and second inlet ports. The hybrid cooling system directs (e.g., injects) refrigerant liquid through the first and second inlet ports and, further, directs refrigerant vapor to a jacket (e.g., annular chamber, heating jacket) that surrounds the stator via the third inlet port. As the refrigerant liquid absorbs heat from the motor, some liquid refrigerant may evaporate into a vapor and travel along a gap between the rotor and the stator. In addition to regulating the temperature of components of the motor, the refrigerant vapor may augment or increase a flow of the vapor along the gap, further improving or equalizing a temperature distribution of the rotor and stator. As such, the hybrid cooling system may increase an efficiency of the motor and increase the operating range of the compressor and/or the HVAC&R system, while reducing overcooling and/or external condensation of the motor.

Figure 1:
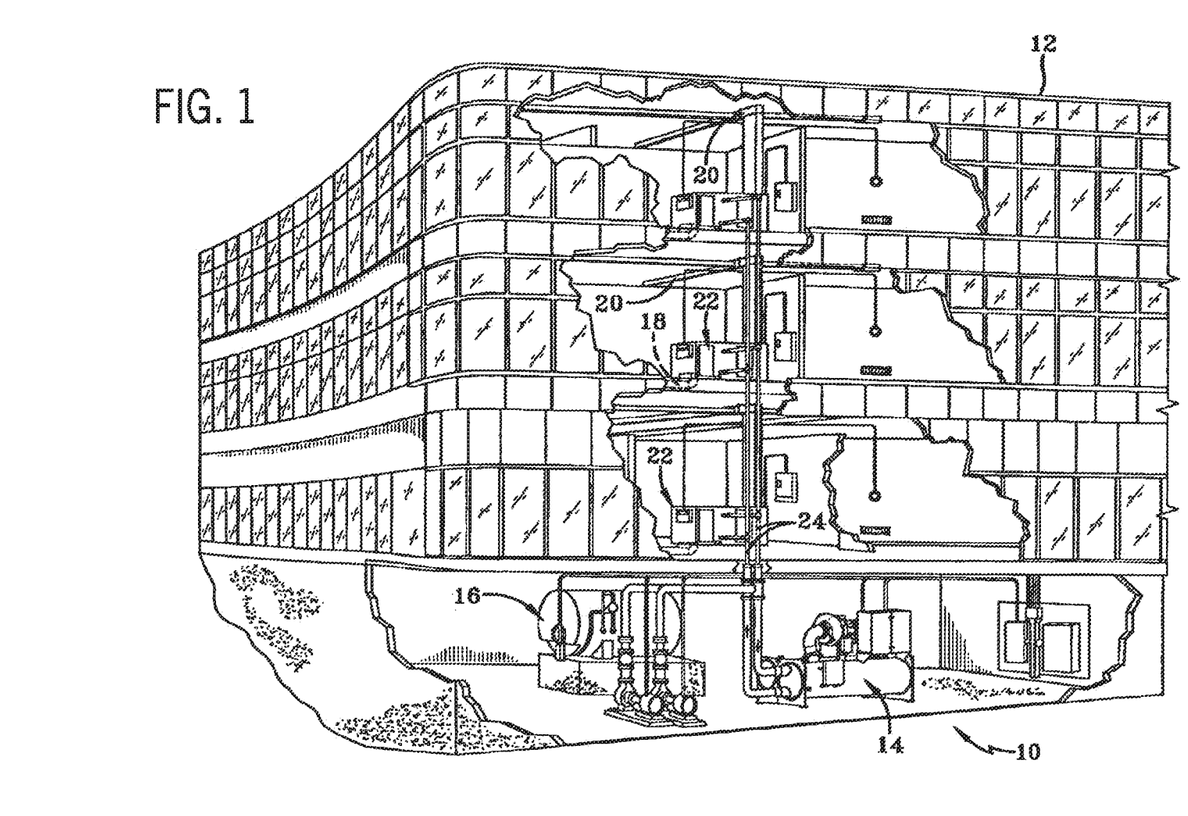
FIG. 1 is a perspective view of an embodiment of a building that may utilize a heating, ventilation, air conditioning, and refrigeration (HVAC&R) system in a commercial setting, in accordance with an aspect of the present disclosure.

Turning now to the drawings, FIG. 1 is a perspective view of an embodiment of an environment for a heating, ventilation, air conditioning, and refrigeration (HVAC&R) system 10 in a building 12 for a typical commercial setting. The HVAC&R system 10 may include a vapor compression system 14 that supplies a chilled liquid, which may be used to cool the building 12. The HVAC&R system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC&R system 10. The HVAC&R system 10 is shown with a separate air handler on each floor of building 12, but in other embodiments, the HVAC&R system 10 may include air handlers 22 and/or other components that may be shared between or among floors.

Figure 2:
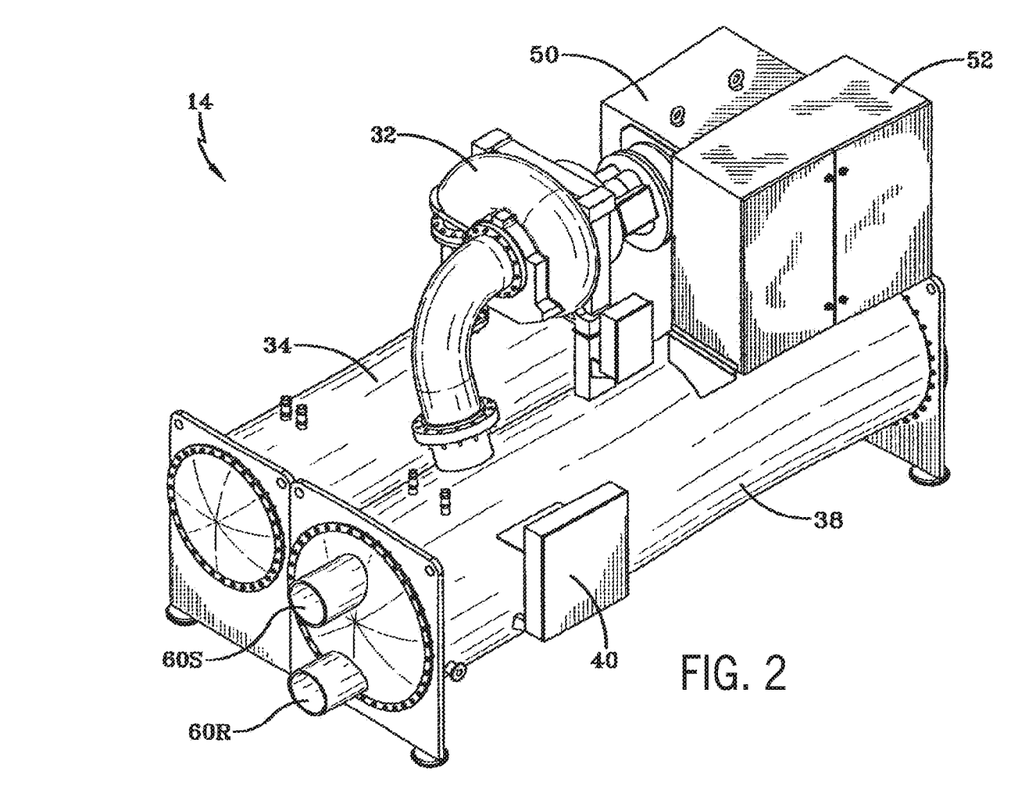
FIG. 2 is a perspective view of an embodiment of a vapor compression system, in accordance with an aspect of the present disclosure.
Figure 3:
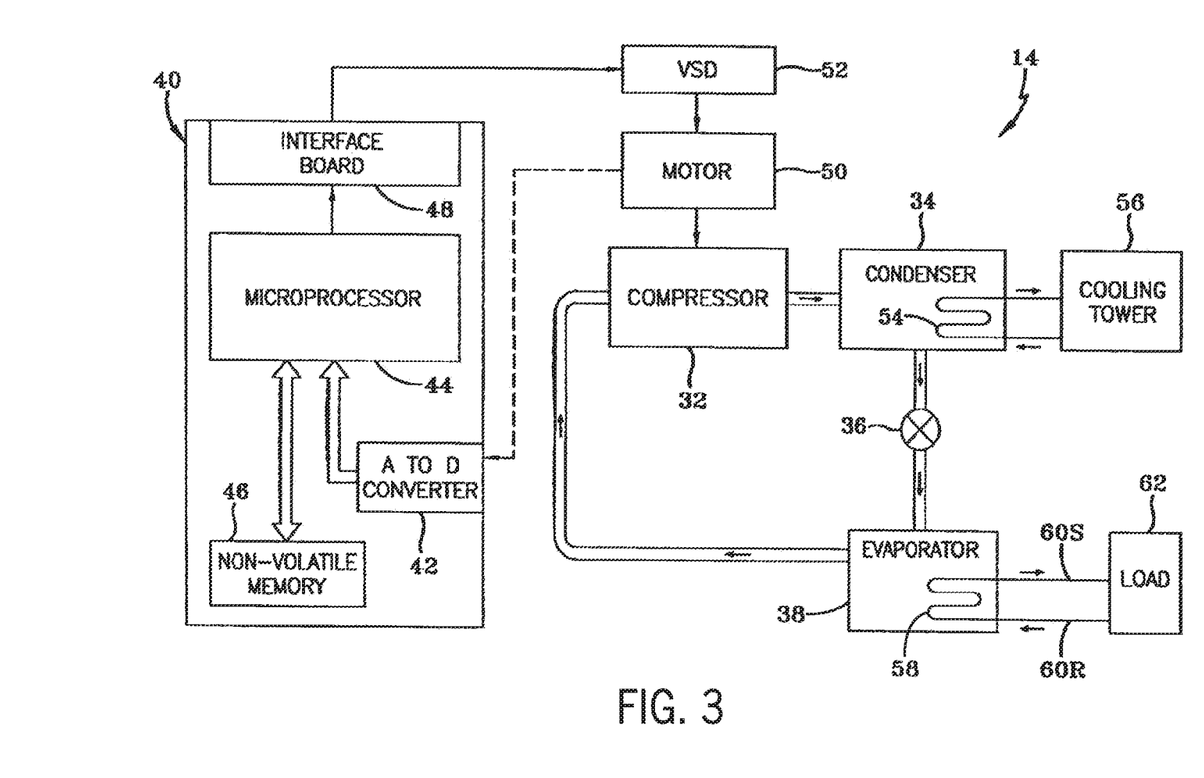
FIG. 3 is a schematic of an embodiment of the vapor compression system of FIG. 2, in accordance with an aspect of the present disclosure.

FIGS. 2 and 3 are embodiments of the vapor compression system 14 that can be used in the HVAC&R system 10. The vapor compression system 14 may circulate a refrigerant through a circuit starting with a compressor 32. The circuit may also include a condenser 34, an expansion valve(s) or device(s) 36, and a liquid chiller or an evaporator 38. The vapor compression system 14 may further include a control panel 40 that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R-410A, R-407, R-134a, hydrofluoro olefin (HFO), "natural" refrigerants like ammonia ($NH_3$), R-717, carbon dioxide ($CO_2$), R-744, or hydrocarbon based refrigerants, water vapor, or any other suitable refrigerant. In some embodiments, the vapor compression system 14 may be configured to efficiently utilize refrigerants having a normal boiling point of about 19 degrees Celsius (66 degrees Fahrenheit) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or device 36, and/or the evaporator 38. The motor 50 may drive the compressor 32 and may be powered by a variable speed drive (VSD) 52. The VSD 52 receives alternating current (AC) power having a particular fixed line voltage and fixed line frequency from an AC power source, and provides power having a variable voltage and frequency to the motor 50. In other embodiments, the motor 50 may be powered directly from an AC or direct current (DC) power source. The motor 50 may include any type of electric motor that can be powered by a VSD or directly from an AC or DC power source, such as a switched reluctance motor, an induction motor, an electronically commutated permanent magnet motor, or another suitable motor.

The compressor 32 compresses a refrigerant vapor and delivers the vapor to the condenser 34 through a discharge passage. In some embodiments, the compressor 32 may be a centrifugal compressor. The refrigerant vapor delivered by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. The liquid refrigerant from the condenser 34 may flow through the expansion device 36 to the evaporator 38. In the illustrated embodiment of FIG. 3, the condenser 34 is water cooled and includes a tube bundle 54 connected to a cooling tower 56, which supplies the cooling fluid to the condenser.

The liquid refrigerant delivered to the evaporator 38 may absorb heat from another cooling fluid, which may or may not be the same cooling fluid used in the condenser 34. The liquid refrigerant in the evaporator 38 may undergo a phase change from the liquid refrigerant to a refrigerant vapor. As shown in the illustrated embodiment of FIG. 3, the evaporator 38 may include a tube bundle 58 having a supply line 60S and a return line 60R connected to a cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the vapor refrigerant exits the evaporator 38 and returns to the compressor 32 by a suction line to complete the cycle.

Figure 4:
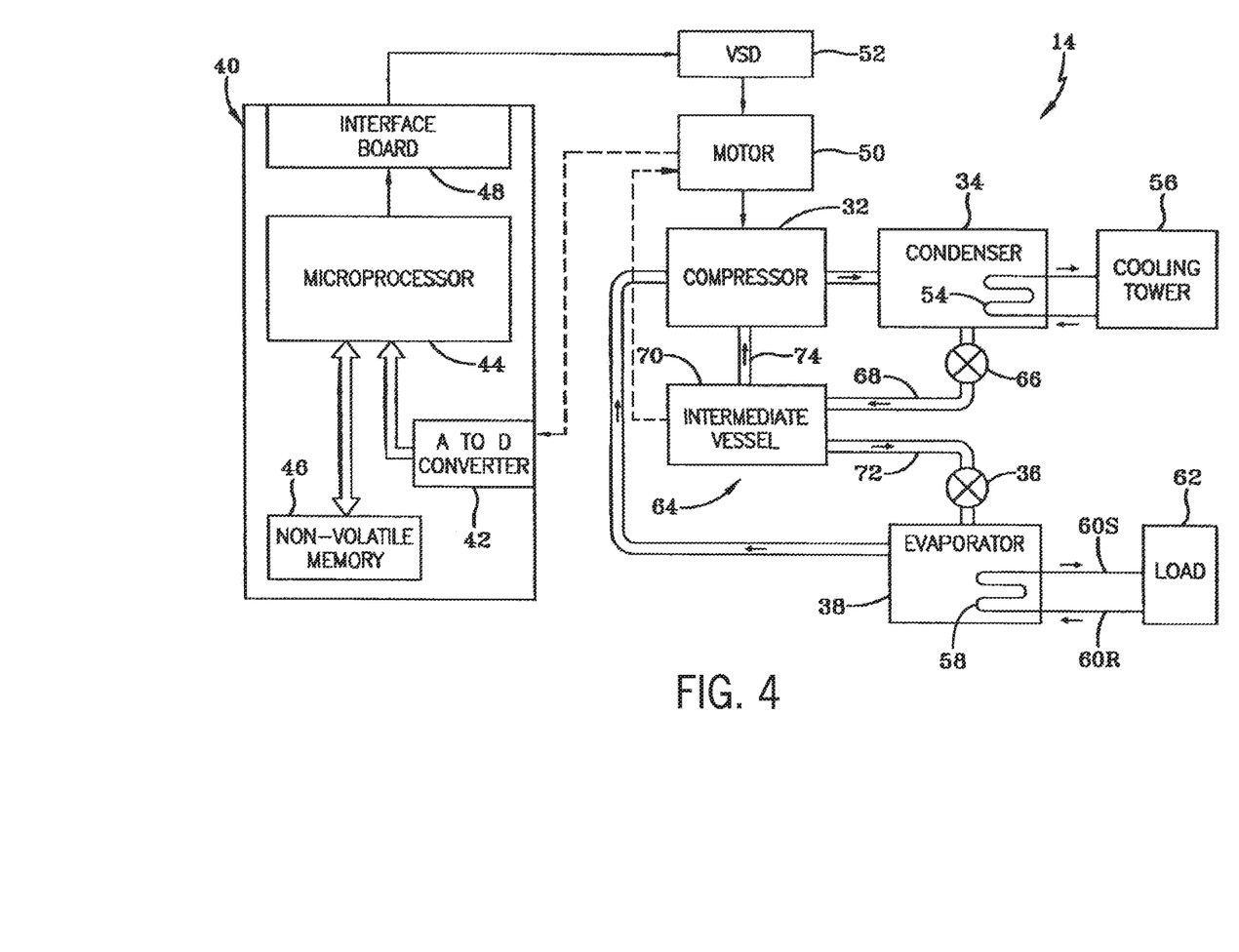
FIG. 4 is a schematic of an embodiment of the vapor compression system of FIG. 2, in accordance with an aspect of the present disclosure.

FIG. 4 is a schematic of the vapor compression system 14 with an intermediate circuit 64 incorporated between condenser 34 and the expansion device 36. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 4, the inlet line 68 includes a first expansion device 66 positioned upstream of an intermediate vessel 70. In some embodiments, the intermediate vessel 70 may be a flash tank (e.g., a flash intercooler). In other embodiments, the intermediate vessel 70 may be configured as a heat exchanger or a "surface economizer." In the illustrated embodiment of FIG. 4, the intermediate vessel 70 is used as a flash tank, and the first expansion device 66 is configured to lower the pressure of (e.g., expand) the liquid refrigerant received from the condenser 34. During the expansion process, a portion of the liquid may vaporize, and thus, the intermediate vessel 70 may be used to separate the vapor from the liquid received from the first expansion device 66. Additionally, the intermediate vessel 70 may provide for further expansion of the liquid refrigerant because of a pressure drop experienced by the liquid refrigerant when entering the intermediate vessel 70 (e.g., due to a rapid increase in volume experienced when entering the intermediate vessel 70). The vapor in the intermediate vessel 70 may be drawn by the compressor 32 through a suction line 74 of the compressor 32. In other embodiments, the vapor in the intermediate vessel may be drawn to an intermediate stage of the compressor 32 (e.g., not the suction stage). The liquid that collects in the intermediate vessel 70 may be at a lower enthalpy than the liquid refrigerant exiting the condenser 34 because of the expansion in the expansion device 66 and/or the intermediate vessel 70. The liquid from intermediate vessel 70 may then flow in line 72 through a second expansion device 36 to the evaporator 38.

Figure 5:
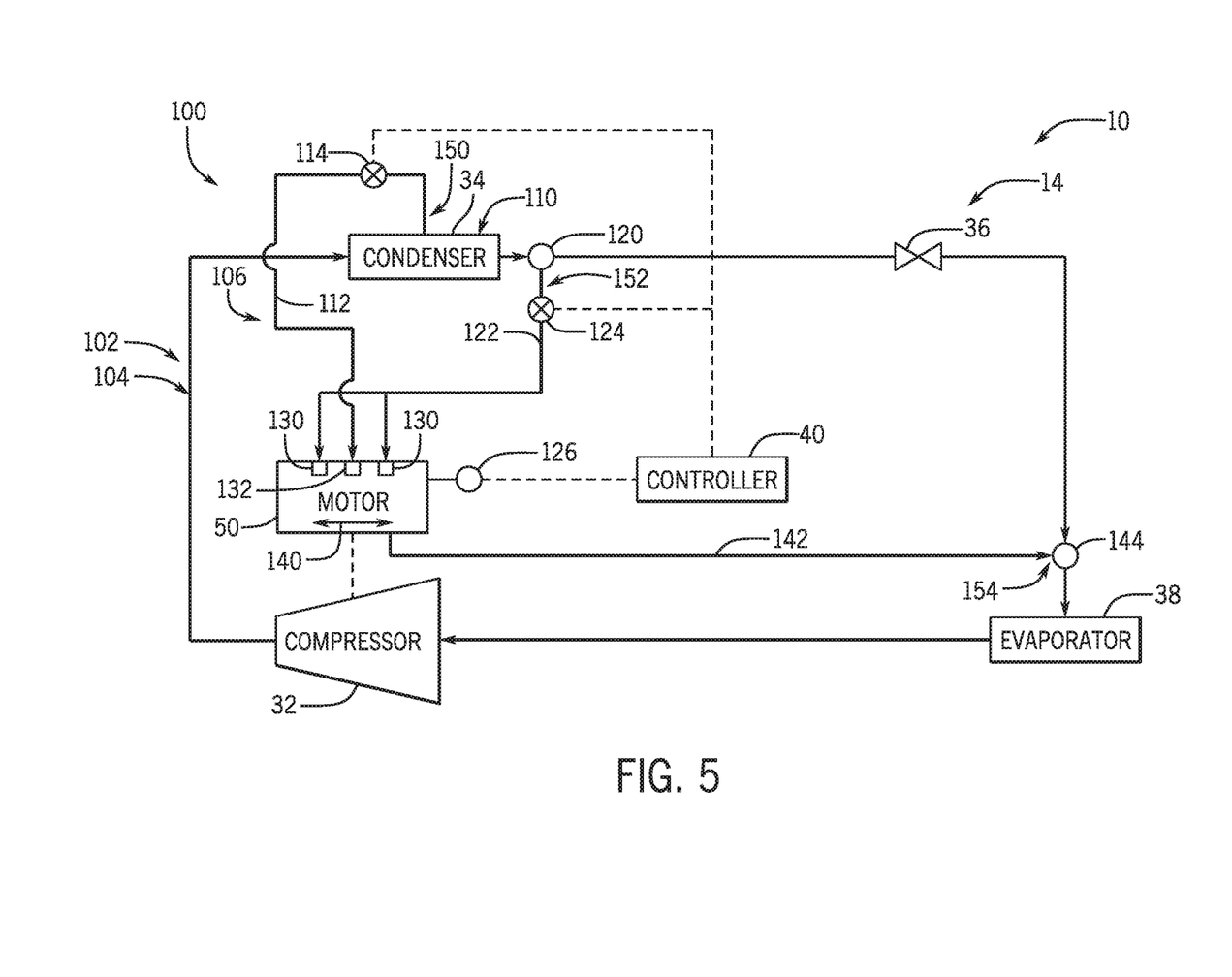
FIG. 5 is a schematic of an embodiment of the vapor compression system having a hermetic motor that utilizes a hybrid cooling system, which receives refrigerant vapor from a condenser, in accordance with an aspect of the present disclosure.

As noted above, the motor 50 used in the vapor compression system 14 of FIGS. 1-4 may generate heat during operation and, accordingly, is generally cooled using refrigerant directed from a relatively high pressure portion of the vapor compression system 14, such as the condenser 34. To help illustrate, FIG. 5 is a schematic diagram of an embodiment of a hybrid cooling system 100 that circulates refrigerant to the motor 50 to cool the motor 50. As described above, a main refrigerant circuit 102 cyclically directs refrigerant through the compressor 32, the condenser 34, the expansion device 36, and the evaporator 38, which may be coupled in series with one another. As used herein, a high pressure side 104 of the main refrigerant circuit 102 extends between an outlet of the compressor 32 and an inlet of the expansion device 36. The illustrated embodiment of the hybrid cooling system 100 includes a motor cooling circuit 106 (e.g., cooling refrigerant circuit), which directs refrigerant from multiple portions of the high pressure side 104 of the main refrigerant circuit 102 to cool the motor 50. As described herein, the hybrid cooling system 100 implements a combination of refrigerant vapor and refrigerant liquid, directed through respective inlet ports into the motor 50, to efficiently cool components (e.g., a stator, a rotor, and/or bearings) within the motor 50. The hybrid cooling system 100 is initially discussed with reference to the refrigerant vapor being diverted to the motor cooling circuit 106 from the condenser 34, though as will be understood, the refrigerant vapor may alternatively be diverted from a discharge of the compressor 32, the intermediate vessel 70 discussed above, or another suitable high pressure source of the vapor compression system 14.

In the illustrated embodiment, the motor cooling circuit 106 directs refrigerant vapor from a top portion 110 of the condenser 34, along a vapor conduit 112 of the motor cooling circuit 106, and into a housing of the motor 50. For example, an outlet port may be formed through a shell of the condenser 34 to enable the high pressure refrigerant vapor therein to exit the shell and enter the vapor conduit 112.

Although indicated as the top portion 110 of the condenser 34, it should be understood that the refrigerant vapor may be drawn from any suitable location from the shell of the condenser 34. A first valve 114 (e.g., vapor control valve) may be disposed along the vapor conduit 112 downstream of the condenser 34 with respect to the flow of refrigerant along the vapor conduit 112. The first valve 114 operates to adjust an amount of the refrigerant vapor that is directed along the motor cooling circuit 106 from the condenser 34 to the motor 50.

Additionally, to supplement the refrigerant vapor, the motor cooling circuit 106 directs a portion of the refrigerant liquid exiting the condenser 34 to the housing of the motor 50. For example, a first tee 120 (e.g., three-way valve) may divert a portion of the refrigerant liquid from the main refrigerant circuit 102 to a liquid conduit 122 of the motor cooling circuit 106. Additionally, a second valve 124 (e.g., liquid control valve) may be disposed along the liquid conduit 122 downstream of the condenser 34 with respect to the flow of refrigerant along the liquid conduit 122. The liquid conduit 122 of the present embodiment includes a single conduit inlet and two conduit outlets. It should be understood that any suitable control device (e.g., valve) may be included along the liquid conduit 122 to enable the hybrid cooling system 100 to control the relative flows of refrigerant liquid out of the two conduit outlets. Indeed, in other embodiments, the second valve 124 may be replaced with two valves, which are each designed to control refrigerant liquid flow from a respective conduit outlet of the liquid conduit 122.

The valves 114, 124 may each be any suitable valve that passively or actively controls the refrigerant flow therethrough, such as a fixed-orifice valve, a variable-orifice valve, a ball valve, a butterfly valve, a gate valve, a globe valve, a diaphragm valve, and/or another suitable valve. In some embodiments, one or both of the valves 114, 124 are coupled to the control panel 40, hereinafter referred to as a controller 40. The controller 40 may adjust a respective position of the valves 114, 124 to control flows of the refrigerant through the conduits 112, 122 of the motor cooling circuit 106, such as based on a temperature of the motor 50 monitored by a sensor 126 (e.g., temperature sensor), for example. The controller 40 of the hybrid cooling system 100 may individually adjust flows of the refrigerant vapor relative to the refrigerant liquid, in some embodiments. For example, the controller 40 may increase the flow of the refrigerant vapor relative to the flow of the refrigerant liquid (e.g., via adjusting the valves 114, 124) in response to determining that the temperature of the motor 50 is below a predefined threshold, thereby increasing the temperature of the motor 50. Alternatively, the controller 40 may decrease the flow of the refrigerant vapor relative to the flow of the refrigerant liquid in response to determining that the temperature of the motor is above a predefined threshold. In some embodiments, the valves 114, 124 may be manually controlled based on expected or scheduled operation of the vapor compression system 14. Alternatively, one or both of the valves 114, 124 may be omitted in situations in which the respective conduits 112, 122 have a size (e.g., diameter, fixed orifice size) suitable for regulating the flow of refrigerant along the motor cooling circuit 106 based on operation of the vapor compression system 14.

As discussed below, the hybrid cooling system 100 therefore directs the refrigerant liquid into the housing of the motor 50 via two liquid inlet ports 130 and, further, directs the refrigerant vapor into the housing of the motor 50 via a vapor inlet port 132. In some embodiments, the liquid inlet ports 130 are coupled in series with one another, such that an initial flow of refrigerant liquid is directed to an upstream one of the liquid inlet ports 130 before a subsequent flow of refrigerant liquid is directed to a downstream one of the liquid inlet ports 130. The vapor inlet port 132 is positioned in between the liquid inlet ports 130 relative to a longitudinal axis 140 of the motor 50, thereby enabling the single flow of refrigerant vapor to interact with both flows of the refrigerant liquid. The hybrid cooling system 100 therefore places the refrigerant flows in a heat exchange relationship with one another and any suitable components (e.g., a stator, a rotor, and/or bearings) of the motor 50. Accordingly, the refrigerant absorbs thermal energy (e.g., heat) from the motor 50 to reduce a temperature of the motor 50, while reducing or preventing overcooling of the housing of the motor 50. The warmed refrigerant is then directed from the motor 50 back toward the main refrigerant circuit 102 via a return conduit 142 of the motor cooling circuit 106, enabling the warmed refrigerant to flow into the evaporator 38. In some embodiments, the return conduit 142 is coupled to the main refrigerant circuit 102 via a second tee 144 or three-way valve, though any other suitable connection device may be utilized. As noted herein, the motor cooling circuit 106 therefore includes three connection points to the main refrigerant circuit: a refrigerant vapor inlet 150 (corresponding to the top portion 110 of the condenser 34), a refrigerant liquid inlet 152 (corresponding to the first tee 120), and a refrigerant outlet 154 (corresponding to the second tee 144).

In some embodiments, the motor cooling circuit 106 includes a flow generating device, such as a pump, an eductor, a compressor, or another suitable device that facilitates respective flows of the refrigerant through the motor cooling circuit 106. In other embodiments, the refrigerant travels through the respective conduits 112, 122 of the motor cooling circuit 106 via a pressure differential between the refrigerant upstream of the motor 50 and downstream of the motor 50. For example, a pressure of the refrigerant vapor diverted from the top portion 110 of the condenser and/or a pressure of the refrigerant exiting the condenser 34 may be greater than the pressure of the refrigerant entering the evaporator 38 because of a pressure drop caused by the expansion device 36.

Figure 6:
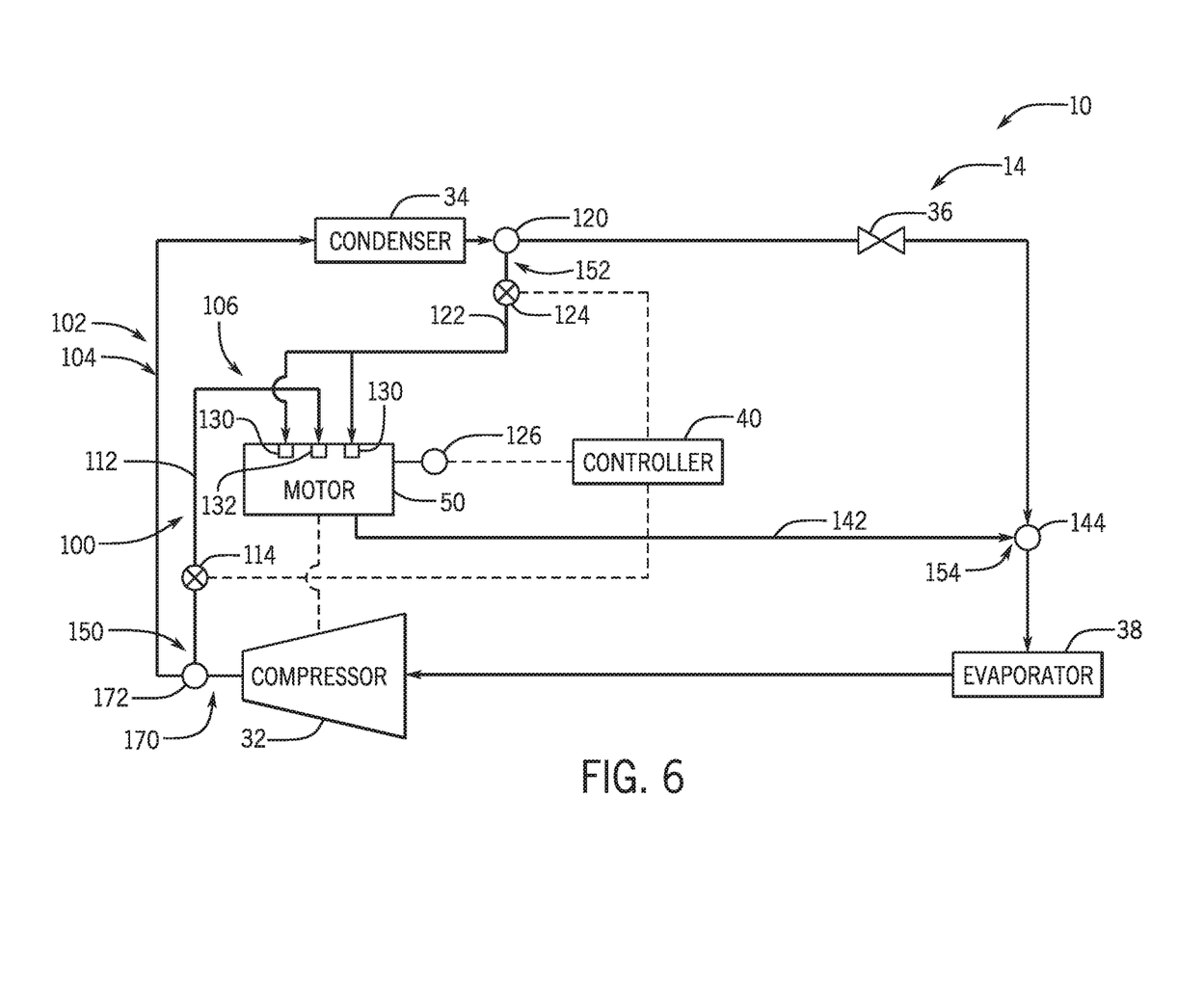
FIG. 6 is a schematic of an embodiment of the vapor compression system having a hermetic motor that utilizes a hybrid cooling system, which receives refrigerant vapor from a compressor, in accordance with an aspect of the present disclosure.

FIG. 6 is a schematic diagram of another embodiment of the hybrid cooling system 100, which receives refrigerant vapor from a compressor discharge portion 170 of the vapor compression system 14. In the illustrated example, the motor cooling circuit 106 includes a third tee 172 that diverts a portion of the refrigerant vapor that exits the compressor 32. Additionally, the vapor conduit 112 extends between the third tee 172 and the vapor inlet port 132 of the housing of the motor 50. The first valve 114 may be disposed along the vapor conduit 112 to enable the controller 40 to adjust the flow of the refrigerant vapor along the vapor conduit 112. The refrigerant vapor may therefore cool the motor 50 in conjunction with the refrigerant liquid from the condenser 34, as discussed above. As such, the connection points from the main refrigerant circuit 102 to the motor cooling circuit 106 include the third tee 172 as the refrigerant vapor inlet 150, the first tee 120 as the refrigerant liquid inlet 152, and the second tee 144 as the refrigerant outlet 154.

In other embodiments, the hybrid cooling system 100 may divert refrigerant vapor from a housing of the compressor 32, such as via a suitably-positioned outlet port formed within the housing of the compressor 32. Moreover, it should be understood that the refrigerant vapor may be directed to the housing of the motor 50 from any other suitable, high pressure portion of the main refrigerant circuit 102 (e.g., extending between the compressor 32 and the expansion device 36 relative to a refrigerant flow direction). Indeed, returning briefly to FIG. 4, the motor cooling circuit 106 may divert refrigerant vapor to the motor 50 from the intermediate vessel 70, which may correspond to a flash tank economizer. In such embodiments, any suitable tees and/or control valves may be included within the hybrid cooling system 100 to enable control of the refrigerant vapor. Additionally, it should be understood that the refrigerant vapor may be provided from two or more of the condenser 34, the compressor 32, and/or the intermediate vessel 70. For example, refrigerant vapor from each of the condenser 34, the compressor 32, and the intermediate vessel 70 may be directed along a common vapor conduit that is provided to the motor 50. Additionally or alternatively, the controller 40 may operate any suitable control valves to enable the refrigerant vapor to be provided to the motor 50 from a first high pressure vapor source during a first time period and from a second high pressure vapor source during a different, second time period.

Figure 7:
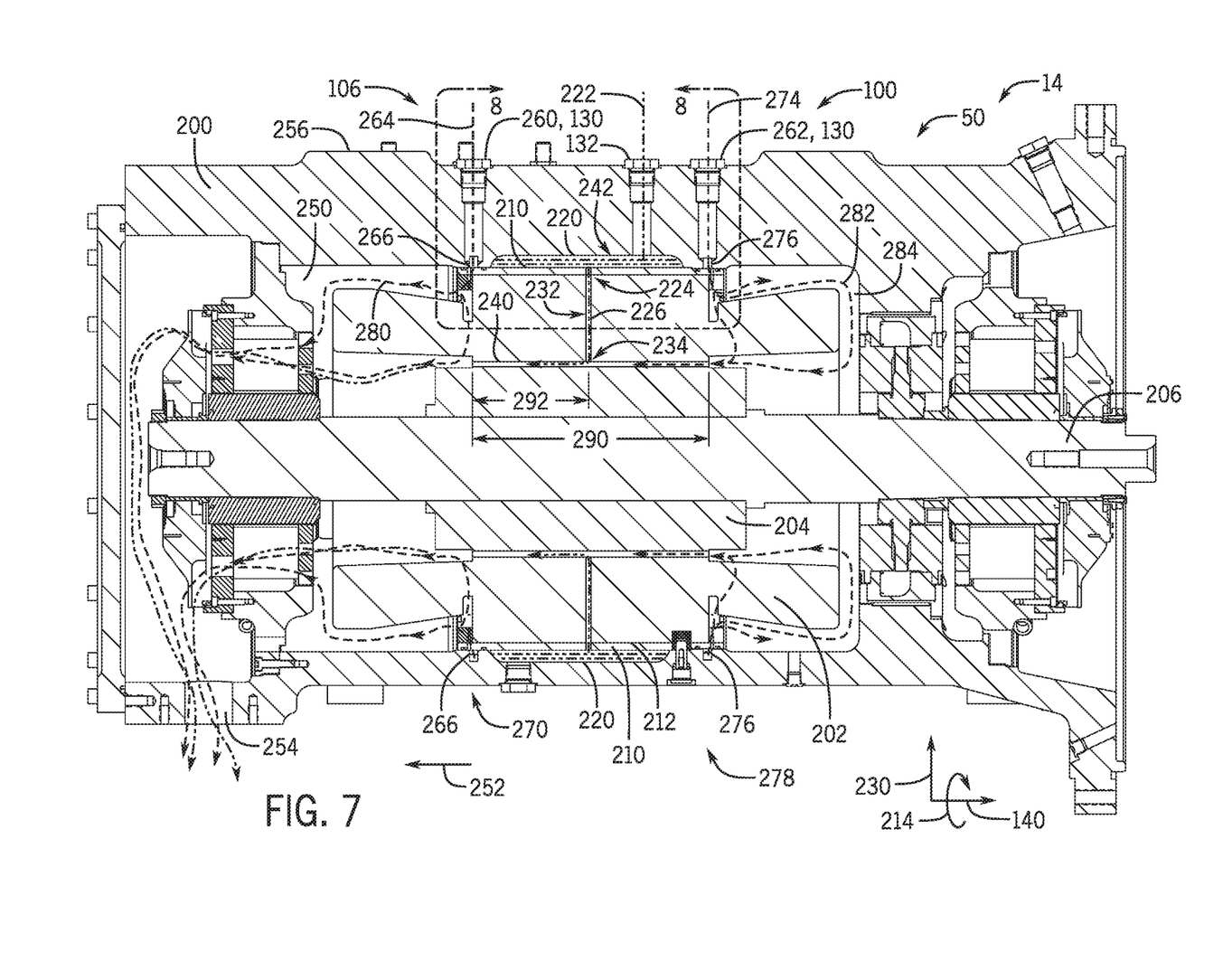
FIG. 7 is a cross-sectional side view of an embodiment of the hermetic motor of FIG. 5 or 6 including the hybrid cooling system, in accordance with an aspect of the present disclosure.

With the above general operation of the hybrid cooling system 100 in mind, further discussion is provided regarding the motor 50 having the hybrid cooling system 100 that directs both refrigerant vapor and refrigerant liquid therethrough. FIG. 7 is a cross-sectional side view of the motor 50 having the hybrid cooling system 100, illustrating refrigerant flow paths in the motor cooling circuit 106 through the motor 50. As shown in the illustrated embodiment of FIG. 7, the motor 50 includes a housing 200, as well as a stator 202, a rotor 204 coupled to a shaft 206, a sleeve 210, and bearings (e.g., ball bearings, sleeve bearings, magnetic bearings, other suitable bearings) disposed in the housing 200. The stator 202 of the motor 50 may be disposed within the sleeve 210, such that the sleeve 210 circumferentially surrounds at least a portion of a radially outward surface 212 of the stator 202 (e.g., relative to a circumferential axis 214 around the longitudinal axis 140 of the motor 50). In some embodiments, the sleeve 210 is formed from a metallic material, such as an aluminum or non-magnetic metal that reduces interference between the sleeve 210 and the electromagnetic field produced between the rotor 204 and the stator 202 as the rotor 204 rotates within the stator 202. In other embodiments, the housing 200 and the stator 202 may be formed in a way that enables the sleeve 210 to be omitted from the motor 50.

In the present embodiment, an annular cavity 220 (e.g., heating jacket, cooling jacket, vapor cooling jacket) is formed between the housing 200 and the sleeve 210. The annular cavity 220 may be a defined volume that extends circumferentially between the sleeve 210 and the housing 200, such that the annular cavity 220 is adjacent to both the housing 200 and the sleeve 210. As recognized herein, the vapor inlet port 132 is coupled between the vapor conduit 112 and the annular cavity 220, enabling the hybrid cooling system 100 to direct a refrigerant vapor flow 222 (e.g., vapor flow) into the housing 200 and into the annular cavity 220 to cool the housing 200, the sleeve 210, and the stator 202 of the motor 50. As discussed above, the refrigerant vapor flow 222 supplied to the housing 200 may be refrigerant vapor diverted from the condenser 34, the compressor 32, and/or the intermediate vessel 70 discussed above with respect to FIG. 4.

In some embodiments, the annular cavity 220 extends around a full circumference of the sleeve 210, which enables the refrigerant vapor flow 222 to transfer heat between the housing 200 and the full circumference of the sleeve 210. The annular cavity 220 is fluidly coupled to an upstream end 224 of a vent slot 226 that extends radially (e.g., along radial axis 230) through a central portion 232 of the stator 202, such as a lamination stack of the stator 202. For example, any suitable number of openings (e.g., drilled holes, radial openings) may be formed within the sleeve 210 to enable the annular cavity 220 to fluidly couple to the vent slot 226. In some embodiments, each radial opening of the sleeve 210 may be radially centered or aligned with a corresponding vent slot 226 of multiple vent slots 226 to enable the refrigerant vapor flow 222 to enter the multiple vent slots 226. In any case, a downstream end 234 of the one or multiple vent slots 226 may be fluidly coupled to a gap 240 (e.g., air gap, annular gap) formed between the stator 202 and the rotor 204.

As such, the hybrid cooling system 100 includes a vapor flow path 242 through the housing 200 that enables the refrigerant vapor flow 222 to fill the annular cavity 220, travel along the vent slot 226, and travel into the gap 240. The refrigerant vapor flow 222 may therefore absorbs thermal energy from the housing 200, the stator 202 and the rotor 204. The vent slot 226 thus enables the refrigerant vapor flow 222 to maintain a temperature of components within the housing 200, which may further enhance an efficiency of the motor 50. The vapor flow path 242 extends from the gap 240 to a first cavity 250 (e.g., downstream cavity relative to a refrigerant flow direction 252) in the housing 200, which directs the refrigerant vapor flow 222 toward a vent 254 out of the housing 200 and toward the evaporator 38. As the refrigerant flows from the stator 202 along an exit path toward the vent 254, the refrigerant vapor flow 222 (and/or the evaporated refrigerant vapor flows discussed below) may also contact and absorb heat from the rotor 204 and/or bearings in the housing 200.

Additionally, because the refrigerant vapor flow 222 fills the annular cavity 220 in contact with the housing 200, the refrigerant vapor flow 222 efficiently maintains a target temperature range of the housing 200, with a reduced potential (e.g., relative to liquid refrigerant cooling) for lowering the temperature of the housing 200 below a dew point that may lead to external condensation generation. That is, the refrigerant vapor flow 222 within the annular cavity 220 may operate as a warming or heating jacket that raises the temperature of the housing 200 in certain conditions above a dew point that would otherwise enable condensation formation on an exterior surface 256 of the housing 200. Moreover, compared to cooling systems that may direct a refrigerant liquid along a vent slot, the presently disclosed hybrid cooling system 100 provides a higher flow rate of refrigerant vapor along the gap 240, thereby providing more efficient cooling with reduced stagnation, reduced air-gap windage loss, and improved temperature distribution. Further, the refrigerant vapor flow 222 traveling along the vapor flow path 242 may augment (e.g., supplement) flows of evaporated or flashed refrigerant liquid provided from the second liquid inlet port 262 and through the gap 240 to enable targeted cooling, without overcooling that may lead to condensation of the housing 200, as discussed herein. As noted above, the refrigerant vapor flow 222 may be provided from the condenser 34, the compressor 32, and/or the intermediate vessel 70.

Indeed, as illustrated, the hybrid cooling system 100 may direct refrigerant liquid, such as refrigerant liquid from the condenser 34, into the housing 200 through a first liquid inlet port 260 and/or the second liquid inlet port 262 of the liquid inlet ports 130. As mentioned, the liquid inlet ports 130 are formed through the housing 200 on either lateral side of the vapor inlet port 132 (e.g., relative to the longitudinal axis 140), such that the refrigerant vapor flow 222 interacts or mixes with vaporized flows of the refrigerant liquid provided through both liquid inlet ports 130. In some embodiments, the first liquid inlet port 260 directs a first refrigerant liquid flow 264 (e.g., first liquid flow) into a first annulus 266, which surrounds the stator 202 at a first end 270 of the motor 50 (e.g., an opposite drive end, corresponding to first axial end of stator 202). Similarly, the second liquid inlet port 262 directs a second refrigerant liquid flow 274 (e.g., second liquid flow) into a second annulus 276 that surrounds the stator 202 at a second end 278 of the motor 50 (e.g., a drive end, corresponding to second axial end of stator 202). In some embodiments, the annuli 266, 276 may be formed within the housing 200 adjacent to the sleeve 210, such that the annuli 266, 276 at least partially surround the sleeve 210 and the stator 202. For example, the annuli 266, 276 may be positioned at locations along a length of the motor 50 corresponding to the liquid inlet ports 260, 262, which may be respectively positioned at the first end 270 (e.g., the opposite drive end, first axial end) of the motor 50 and the second end 272 (e.g., the drive end, second axial end) of the motor 50.

In some embodiments, the refrigerant liquid flows 264, 274 are provided to the housing 200 in series, such that the second refrigerant liquid flow 274 is directed or provided to the housing 200 and fills the second annulus 276. Thereafter, because the second annulus 276 is generally filled, the hybrid cooling system 100 may direct or provide the first refrigerant liquid flow 264 to the first annulus 266. In other embodiments, the refrigerant liquid flows 264, 274 may be provided to the housing 200 in parallel. In either case, after respectively filling the annuli 266, 276, the refrigerant liquid flows 264, 274 may then be continuously discharged through openings circumferentially spaced about each of the annuli 266, 276, such that the refrigerant liquid flows 264, 274 travel radially inward from the openings of the annuli 266, 276 and come into contact with windings of the stator 202. It should be understood that, as the refrigerant liquid flows 264, 274 pass through the openings, the hybrid cooling system 100 may continuously fill the annuli 266, 276 to enable continuous cooling. In some embodiments, the first refrigerant liquid flow 264 discharged from the first annulus 266 may absorb significant heat from the stator 202 and transform into a first evaporated refrigerant vapor flow 280 (e.g., first evaporated vapor flow, flow initially provided to housing 200 as liquid), which flows through the first cavity 250 of the housing 200. The first evaporated refrigerant vapor flow 280 may therefore mix with the refrigerant vapor flow 222 within the first cavity 250 before being discharged back toward the main refrigerant circuit 102. Accordingly, the first evaporated refrigerant vapor flow 280 may join the refrigerant vapor flow 222 and travel from the first cavity 250 and to the evaporator 38.

Additionally, the second refrigerant liquid flow 274 discharged from the second annulus 276 may similarly absorb significant heat from the stator 202 and transform into a second evaporated refrigerant vapor flow 282 (e.g., second evaporated vapor flow, flow initially provided to housing 200 as liquid). The second evaporated refrigerant vapor flow 282 may travel through a second cavity 284 of the housing 200 (e.g., upstream cavity, upstream portion of main cavity defined by first cavity 250 and second cavity 284) and toward an upstream end of the gap 240. All or a portion of the second evaporated refrigerant vapor flow 282 may therefore travel along a full length 290 of the gap 240, along the longitudinal axis 140, to mix with the refrigerant vapor flow 222 within the gap 240. In other words, the second evaporated refrigerant vapor flow 282 may traverse the full length 290 of the gap, while the refrigerant vapor flow 222 traverses a partial length 292 of the gap 240 that is defined between the vent slot 226 and the downstream end of the gap 240. Because the refrigerant vapor flow 222 enters the gap 240 from the vent slot 226 that is between the upstream end and the downstream end of the gap 240, the refrigerant vapor flow 222 may augment the second evaporated refrigerant vapor flow 282, while equalizing a temperature distribution between the rotor 204 and the stator 202. Then, the second evaporated refrigerant vapor flow 282 may travel with the first evaporated refrigerant vapor flow 280 and the refrigerant vapor flow 222 through the first cavity 250 and out of the vent 254.

Indeed, because the refrigerant liquid flows 264, 274 may be vaporized by the thermal energy absorbed from portions of the motor 50, augmenting or supplementing the refrigerant liquid flows 264, 274 with the intermediately-supplied refrigerant vapor flow 222 may stabilize the temperature of the rotor 204 and the stator 202, blocking potential overcooling or formation of cold spots within the motor 50. The hybrid cooling system 100 may also alleviate demand for an inclusion of a drain in the housing 200 that enables unevaporated portions of the refrigerant liquid flows 264, 274 to return to the main refrigerant circuit 102, thereby reducing a complexity of the motor 50. Moreover, compared to directly injecting refrigerant vapor to the gap 240, the hybrid cooling system 100 provides the refrigerant vapor flow 222 to the gap 240 through the vent slot 226, which is more efficient and reliable, while also integrating more naturally with the refrigerant liquid flows 264, 274.

Figure 8:
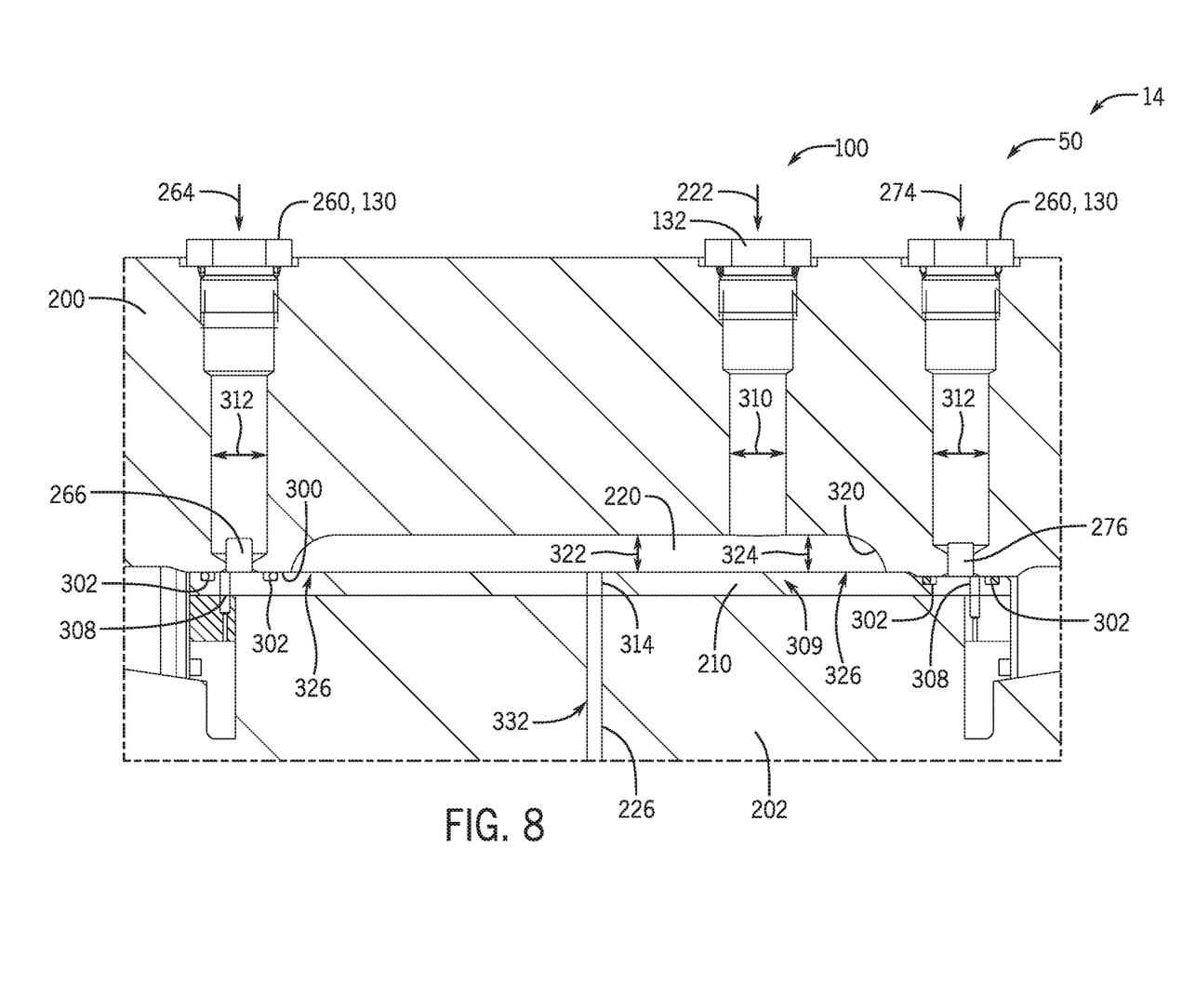
FIG. 8 is a partial cross-sectional side view of an embodiment of the hermetic motor of FIG. 7 illustrating a refrigerant vapor inlet and two refrigerant liquid inlets, in accordance with an aspect of the present disclosure.

FIG. 8 is an expanded partial cross-sectional side view of the inlet ports 132, 260, 262 of the hybrid cooling system 100 of the motor 50. As illustrated, the annuli 266, 276 are sealed between the sleeve 210 and a surface 300 of the housing 200 using seals 302 (e.g., O-rings, silicone, sealant). As such, the refrigerant liquid flows 264, 274 may be blocked from leaking into the cavities 250, 284 or the annular cavity 220 before flowing into the respective annuli 266, 276 from the respective liquid inlet ports 260, 262. As discussed above, the annuli 266, 276 may each include a number of openings 308, which are defined though a main body 309 of the sleeve 210. The openings 308 may be spaced about the annuli 266, 276 to direct the refrigerant liquid flows 264, 274 toward the stator 202 and absorb heat therefrom.

Additionally, the vapor inlet port 132 is coupled to the annular cavity 220, which extends between the housing 200 and the sleeve 210. The vapor inlet port 132 may have any suitable size for enabling the refrigerant vapor flow 222 to enter the housing 200. For example, in some embodiments, the vapor inlet port 132 has a diameter 310 that is larger than a diameter 312 of the liquid inlet ports 130 to enable the refrigerant vapor flow 222 to travel therethrough. A number of openings 314 (e.g., radial openings, radial holes) may be formed through the main body 309 of the sleeve 210 to fluidly couple the annular cavity 220 to the vent slot 226 (or multiple vent slots 226) defined through the stator 202. For example, 2, 3, 4, 5, 10, 20, or more openings 314 and corresponding vent slots 226 may be formed through the sleeve 210 and stator 202. In other embodiments, the hybrid cooling system 100 may include a single opening 314 that couples the annular cavity 220 to a single vent slot 226. In any case, the refrigerant vapor flow 222 may be selectively directed through the vent slot 226 and through the gap 240 discussed above to facilitate efficient motor cooling.

It should be understood that the vapor inlet port 132 may be positioned in another suitable location within the housing 200, such as aligned with the vent slot 226, or alternatively, on an opposite side of one of the liquid inlet ports 260, 262 with a fluid conduit connecting the vapor inlet port 132 to the annular cavity 220. Additionally, the annular cavity 220 may include any suitable shape, such as one with right angles in place of the illustrated smooth edges 320. Additionally, the annular cavity 220 may include a central height 322 (e.g., radial height) above the vent slot 226 that is different than, instead of equal to, a distal height 324 at edge portions 326 of the annular cavity 220, in other embodiments.

As set forth above, the present disclosure may provide one or more technical effects useful in the cooling of a hermetic motor, such as the motor 50 that drives operation of the compressor 32 of the vapor compression system 14. Embodiments of the disclosure may include a hybrid cooling system 100 that directs a refrigerant vapor flow 222 to an annular cavity 220 that is defined between a housing 200 of the motor 50 and a sleeve 210 that surrounds a stator 202 of the motor 50. The refrigerant vapor flow 222 may travel radially through openings 314 in the sleeve 210 to access a vent slot 226 defined through the stator 202. Then, the refrigerant vapor flow 222 may travel longitudinally along a gap 240 defined between the stator 202 and a rotor 204 of the motor. Moreover, the hybrid cooling system 100 may direct refrigerant liquid flows 264, 274 to respective annuli 266, 276 defined between the housing 200 and the motor 50, axially surrounding the annular cavity 220. The refrigerant liquid flows 264, 274 may be evaporated by heat transferred from the stator 202, generating respective evaporated refrigerant vapor flows 280, 282 that traverse cavities 250, 284 within the housing 200, while being augmented by the refrigerant vapor flow 222 therein. Therefore, the hybrid cooling system 100 enables reduced temperatures of the rotor 204 and more uniform temperature distributions throughout the stator 202, while maintaining the housing 200 of the motor 50 at a temperature above a dew point to block condensation formation. The technical effects and technical problems in the specification are examples and are not limiting. It should be noted that the embodiments described in the specification may have other technical effects and can solve other technical problems.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures), mounting arrangements, use of materials, colors, orientations) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the disclosure, or those unrelated to enabling the claimed disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A hybrid cooling system for a hermetic motor, comprising:
    an annular cavity in a motor housing, the annular cavity configured to receive a vapor flow from a main refrigerant circuit;
    at least one annulus in the motor housing, the at least one annulus configured to receive a liquid flow from the main refrigerant circuit;
    a sleeve disposed within the motor housing adjacent to the annular cavity and the at least one annulus, wherein at least one radial opening is defined through the sleeve and in fluid communication with the annular cavity;
    a stator at least partially surrounded by the sleeve;
    a gap defined between the stator and a rotor of the hermetic motor;
    a vent slot of the stator configured to receive the vapor flow from the annular cavity through the at least one radial opening of the sleeve and direct the vapor flow to the gap; and
    an exit path in the motor housing configured to direct an evaporated vapor flow, generated from the liquid flow contacting the stator, and the vapor flow out of the motor housing.

2. The hybrid cooling system of claim 1, wherein the motor housing comprises a main cavity configured to receive the vapor flow from the gap and receive the evaporated vapor flow, and wherein the motor housing comprises a vent configured to direct the vapor flow and the evaporated vapor flow to a compressor of the main refrigerant circuit.

3. The hybrid cooling system of claim 2, wherein the vapor flow is configured to mix with the evaporated vapor flow in the main cavity after the vapor flow exits the gap.

4. The hybrid cooling system of claim 1, wherein the evaporated vapor flow is configured to traverse a full length of the gap defined between an upstream and a downstream end of the gap, and wherein the vapor flow is configured to traverse a partial length of the gap defined between the vent slot and the downstream end of the gap.

5. The hybrid cooling system of claim 1, wherein the at least one annulus of the motor housing comprises:
    a first annulus at least partially surrounding a first axial end of the sleeve and configured to direct a first liquid flow of the liquid flow through the first axial end of the sleeve and to a first end of the stator, wherein the first end of the stator is configured to evaporate the first liquid flow into a first evaporated vapor flow of the evaporated vapor flow; and
    a second annulus at least partially surrounding a second axial end of the sleeve and configured to direct a second liquid flow of the liquid flow through the second axial end of the sleeve and to a second end of the stator, wherein the second end of the stator is configured to evaporate the second liquid flow into a second evaporated vapor flow of the evaporated vapor flow.

6. The hybrid cooling system of claim 5, wherein the first liquid flow and the second liquid flow are directed to the motor housing from a three-way valve disposed directly downstream of a condenser of the main refrigerant circuit.

7. The hybrid cooling system of claim 1, wherein the vapor flow is directed to the motor housing from a condenser of the main refrigerant circuit.

8. The hybrid cooling system of claim 1, wherein the vapor flow is directed to the motor housing from a discharge portion of a compressor of the main refrigerant circuit.

9. The hybrid cooling system of claim 1, wherein the at least one radial opening defined through the sleeve comprises a plurality of radial openings, wherein the stator comprises a plurality of vent slots that include the vent slot, and wherein the plurality of vent slots are aligned with the plurality of radial openings to enable respective portions of the vapor flow to enter the gap through a corresponding radial opening of the plurality of radial openings and a corresponding vent slot of the plurality of vent slots.

10. The hybrid cooling system of claim 1, wherein the annular cavity extends around a full circumference of the sleeve to enable the vapor flow to transfer heat with the motor housing and the full circumference of the sleeve.

11. A hermetic motor for a compressor of a heating, ventilating, air conditioning, and refrigeration (HVAC&R) system, comprising:
a stator configured to cause rotation of a rotor that drives the compressor, wherein a vent slot is defined through a central portion of the stator to fluidly couple a radially outward surface of the stator to an annular gap defined between the stator and the rotor;
a sleeve circumferentially surrounding a portion of the radially outward surface of the stator; and
a motor housing disposed around the stator and the sleeve, wherein the motor housing defines:
a first annulus and a second annulus each adjacent to the sleeve, wherein the first annulus and the second annulus are each configured to direct a respective liquid flow through the sleeve to the stator; and
an annular chamber adjacent to the sleeve, wherein the annular chamber is axially positioned between the first annulus and the second annulus, and wherein the annular chamber is configured to direct a vapor flow from the annular chamber, through the sleeve and the vent slot, and into the annular gap.

12. The hermetic motor of claim 11, wherein the sleeve comprises at least one radial opening defined through a main body of the sleeve and radially centered with the vent slot to enable the vapor flow to travel through the sleeve.

13. The hermetic motor of claim 11, wherein the motor housing is configured to receive the vapor flow from a top portion of a condenser of a main refrigerant circuit of the HVAC&R system, and wherein the motor housing is configured to receive the respective liquid flow of the first annulus and the second annulus from a discharge portion of the condenser.

14. The hermetic motor of claim 11, wherein the sleeve comprises a first radial opening and a second radial opening defined through a main body of the sleeve, wherein the first radial opening is radially aligned with a first end portion of the stator to enable the respective liquid flow of the first annulus to travel through the sleeve to the first end portion of the stator, and wherein the second radial opening is radially aligned with a second end portion of the stator to enable the respective liquid flow of the second annulus to travel through the sleeve to the second end portion of the stator.

15. The hermetic motor of claim 14, wherein the motor housing is configured to direct the respective liquid flow of the second annulus to the stator, such that the respective liquid flow of the second annulus evaporates into an evaporated vapor flow, and wherein the stator is configured to direct the evaporated vapor flow to mix with the vapor flow along the annular gap.

16. The hermetic motor of claim 11, wherein the motor housing is configured to direct the respective liquid flow of the first annulus and the second annulus to the stator, such that the respective liquid flow of the first annulus and the second annulus evaporates into an evaporated vapor flow, and wherein the motor housing defines a vent configured to direct the evaporated vapor flow and the vapor flow from the motor housing and toward an evaporator of the HVAC&R system.

17. The hermetic motor of claim 16, wherein the vent is configured to direct the evaporated vapor flow and the vapor flow from the motor housing based on a pressure difference between the motor housing and the evaporator.

18. A heating, ventilating, air conditioning, and refrigeration (HVAC&R) system, comprising:
a main refrigerant circuit comprising a compressor, a condenser, an expansion device, and an evaporator coupled in series, wherein a high pressure side of the main refrigerant circuit is defined between an outlet of the compressor and an inlet of the expansion device;
a motor configured to drive the compressor; and
a hybrid cooling system, comprising:
a cooling refrigerant circuit configured to direct a vapor flow from the high pressure side of the main refrigerant circuit to the motor, direct a liquid flow from the condenser to the motor, and direct warmed refrigerant from the motor to the evaporator; and
a housing of the motor defining a first annulus, a second annulus, and an annular chamber axially positioned between the first annulus and the second annulus, wherein the first annulus and the second annulus are each configured to receive the liquid flow from the cooling refrigerant circuit and direct the liquid flow to a stator of the motor, and wherein the annular chamber is configured to receive the vapor flow from the cooling refrigerant circuit and direct the vapor flow to a gap between the stator and a rotor of the motor.

19. The HVAC&R system of claim 18, wherein the hybrid cooling system comprises the stator and a sleeve disposed around at least a portion of the stator adjacent to the annular chamber, wherein the sleeve defines a plurality of radial holes, and wherein the at least a portion of the stator defines a plurality of vent slots extending between the plurality of radial holes and the gap to enable the vapor flow to travel from the annular chamber to the gap.

20. The HVAC&R system of claim 18, wherein the high pressure side of the main refrigerant circuit comprises a top portion of the condenser, a discharge portion of the compressor, or a flash tank economizer of the main refrigerant circuit that is disposed between the condenser and the expansion device.

* * * * *